Patented Feb. 26, 1929.

1,703,186

UNITED STATES PATENT OFFICE.

ROGER ADAMS, OF URBANA, ILLINOIS, ASSIGNOR TO ABBOTT LABORATORIES, OF NORTH CHICAGO, ILLINOIS, A CORPORATION OF ILLINOIS.

CYCLOHEXYL COMPOUND AND PROCESS OF MAKING THE SAME.

No Drawing. Application filed August 8, 1927. Serial No. 211,640.

This invention relates to the preparation of acids and derivatives of the following general structure:

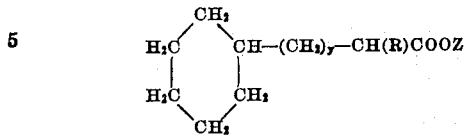

wherein "$y$" is zero or more and where "R" represents an aliphatic hydrocarbon group, for example, alkyl or alkylene, and Z represents hydrogen, a metal, or an alkyl group.

These acids are found to be bactericidal against acid-fast bacteria such as B. Leprae or B. Tuberculosis.

These acids are readily made by condensation of a halogen alkyl cyclohexane with the proper substituted malonic ester, or by condensation of an omega-cyclohexyl-alkyl malonic ester or a cyclohexyl malonic ester with an alkyl halide, then saponification and elimination of carbon dioxide. These are represented in the following series of equations:

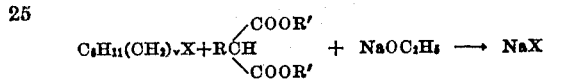

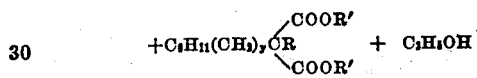

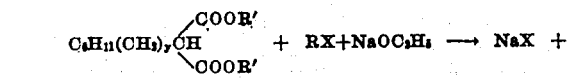

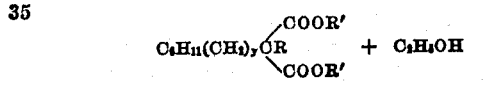

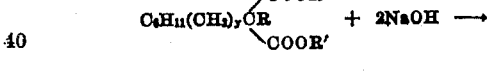

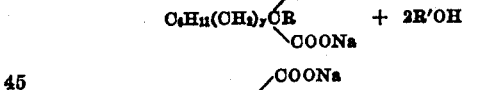

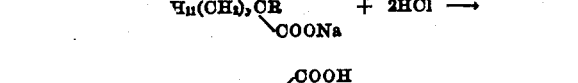

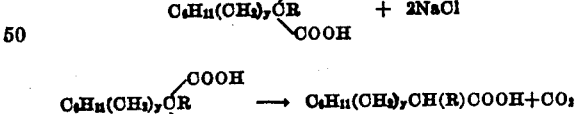

In the above equations, X represents a halogen, $y$ represents zero or more, R represents a hydrocarbon radical, such as alkyl or alkylene, and R' represents an alkyl group.

Without limiting the invention to any particular procedure, the following examples will serve to illustrate the preferred general method.

One molecular equivalent of bromo-alkyl-cyclohexane is added to a mixture of one molecular equivalent of an alkyl-malonic ester, and one molecular equivalent of sodium ethylate, and refluxed in absolute alcohol until neutral. The alcohol is distilled, water is added, and the cyclohexyl alkyl malonic ester or the cyclohexyl-alkyl-alkyl-malonic ester, as the case may be, is separated and purified.

The malonic ester thus produced is treated with alcoholic potash containing four molecular equivalents of potassium hydroxide and refluxed for one to two hours. Upon evaporation of the alcohol, addition of water, then acidification with hydrochloric acid, the malonic acid derivative separates and is readily purified.

The malonic acid derivative thus produced is heated above its melting point and held at that temperature until no more evolution of carbon dioxide takes place. The resulting mixture is then vacuum distilled.

By this general procedure, the following examples were made:

Example I.

Alpha-cyclohexyl alpha-alkyl acetic acids; General formula:—$C_6H_{11}CH(R)COOH$

| Where R is | Boiling point of acid. |
|---|---|
| n-$C_7H_{15}$ | 149° at 2 mm. |
| n-$C_9H_{19}$ | 167° at 2 mm. |
| n-$C_{12}H_{25}$ | 189° at 2 mm. |

Example II.

A.—Cyclohexylethyl alkyl malonic esters; General formula:—

$C_6H_{11}(CH_2)_2C(R)(COOC_2H_5)_2$

B.—Cyclohexylethyl alkyl malonic acids; General formula:—

$C_6H_{11}(CH_2)_2C(R)(COOH)_2$

C.—Gamma-cyclohexyl alpha alkyl butyric acids; General formula:—

$C_6H_{11}(CH_2)_2CH(R)COOH$

| Where R is | Boiling point of A | Melting point of B | Boiling point of C |
|---|---|---|---|
| Ethyl | 146° at 2 mm. | 114–115° | 132° at 2 mm. |
| n-Propyl | 153° at 3 mm. | 132–133° | 122° at 2 mm. |
| n-Heptyl | 171° at 3 mm. | Difficult to crystallize | 182° at 2 mm. |
| Allyl | 142° at 2 mm. | 95–96° | 125° at 2 mm. |

*Example III.*

A.—Cyclohexylpropyl alkyl malonic esters;
General formula:—

$$C_6H_{11}(CH_2)_3C(R)(COOC_2H_5)_2$$

B.—Cyclohexylpropyl alkyl malonic acids;
General formula:—

$$C_6H_{11}(CH_2)_3C(R)(COOH)_2$$

C.—Delta-cyclohexyl alpha-alkyl valeric acids;
General formula:—

$$C_6H_{11}(CH_2)_3CH(R)COOH$$

| Where R is | Boiling point of A | Melting point of B | Boiling point of C |
|---|---|---|---|
| Ethyl | 149–151° at 4 mm. | 142–143° | 146–147° at 2 mm. |
| n-Butyl | 160–161° at 4 mm. | 137–138° | 153–154° at 2 mm. |
| n-Heptyl | 209–210° at 5 mm. | 98–99° | 199–208° at 2 mm. |
| Allyl | 170–172° at 5 mm. | | 147–150° at 2 mm. |

*Example IV.*

A.—Cyclohexylbutyl alkyl malonic esters;
General formula:—

$$C_6H_{11}(CH_2)_4C(R)(COOC_2H_5)_2$$

B.—Cyclohexylbutyl alkyl malonic acids;
General formula:—

$$C_6H_{11}(CH_2)_4C(R)(COOH)_2$$

C.—Cyclohexyl alpha-alkyl hexanoic acids;
General formula:—

$$C_6H_{11}(CH_2)_4CH(R)COOH$$

| Where R is | Boiling point of A | Melting point of B | Boiling point of C |
|---|---|---|---|
| Ethyl | 166° at 4 mm. | 136° | 174° at 3 mm. |
| n-Butyl | 176° at 4 mm. | 113° | 179° at 4 mm. |
| n-Amyl | 192° at 5 mm. | 64° | 208° at 8 mm. |
| Allyl | 169° at 4 mm. | 143° | 175° at 6 mm. |

The temperatures mentioned are in all cases expressed in centigrade degrees.

The scope of the invention should be determined by reference to the appended claims, said claims to be construed as broadly as possible consistent with the state of the art.

I claim as my invention:

1. As new products, substances of the general formula

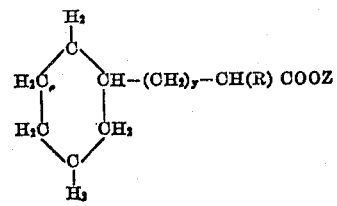

in which "y" represents zero or more, and "R" represents an aliphatic hydrocarbon group, and Z represents hydrogen, a metal, or an alkyl group.

2. The process of making a compound of the type described in claim 1, which consists in introducing an alkyl group and a group containing a cyclohexyl radical into malonic ester, followed by saponification and elimination of one molecule of carbon dioxide.

ROGER ADAMS.